United States Patent
Hardwicke et al.

(10) Patent No.: US 7,360,437 B2
(45) Date of Patent: Apr. 22, 2008

(54) DEVICES FOR EVALUATING MATERIAL PROPERTIES, AND RELATED PROCESSES

(75) Inventors: Canan Uslu Hardwicke, Greenville, SC (US); Melvin Robert Jackson, Corea, ME (US)

(73) Assignee: General Electric Company, Niskyuna, NY (US)

( * ) Notice: Subject to any disclaimer, the term of this patent is extended or adjusted under 35 U.S.C. 154(b) by 200 days.

(21) Appl. No.: 11/170,579

(22) Filed: Jun. 28, 2005

(65) Prior Publication Data
US 2006/0288794 A1    Dec. 28, 2006

(51) Int. Cl.
*G01L 1/00*    (2006.01)
(52) U.S. Cl. ........................ 73/763; 73/788; 73/862.041
(58) Field of Classification Search ................ 73/763, 73/788, 862.041
See application file for complete search history.

(56) References Cited

U.S. PATENT DOCUMENTS

| | | | |
|---|---|---|---|
| 4,138,878 A * | 2/1979 | Holmes et al. ................ 374/7 |
| 4,595,298 A | 6/1986 | Frederick | |
| 4,639,210 A * | 1/1987 | Pennisi ........................ 431/13 |
| 4,730,623 A * | 3/1988 | Lee ............................. 600/505 |
| 4,786,887 A | 11/1988 | Bringmann et al. | |
| 4,939,496 A | 7/1990 | Destannes | |
| 5,437,745 A * | 8/1995 | Frank et al. ................. 148/435 |
| 5,474,619 A * | 12/1995 | Kreider ....................... 136/239 |
| 6,576,861 B2 | 6/2003 | Sampath et al. | |
| 6,660,680 B1 | 12/2003 | Hampden-Smith et al. | |
| 7,004,622 B2 * | 2/2006 | Hardwicke et al. ......... 374/141 |
| 2002/0063117 A1 | 5/2002 | Church et al. | |
| 2004/0101022 A1 * | 5/2004 | Hardwicke et al. ......... 374/141 |
| 2004/0121182 A1 | 6/2004 | Hardwicke et al. | |
| 2004/0265488 A1 | 12/2004 | Hardwicke et al. | |
| 2005/0013926 A1 | 1/2005 | Rutkowski et al. | |
| 2005/0015175 A1 | 1/2005 | Huang | |
| 2005/0029236 A1 | 2/2005 | Gambino et al. | |
| 2005/0287386 A1 * | 12/2005 | Sabol et al. ................. 428/543 |
| 2006/0018361 A1 * | 1/2006 | Hardwicke et al. ......... 374/141 |
| 2006/0020415 A1 * | 1/2006 | Hardwicke et al. ......... 702/133 |

FOREIGN PATENT DOCUMENTS

EP    1187234    11/2007

OTHER PUBLICATIONS

EP Search Report, EP06255012, Nov. 19, 2007.

* cited by examiner

*Primary Examiner*—Edward Lefkowitz
*Assistant Examiner*—Freddie Kirkland, III
(74) *Attorney, Agent, or Firm*—Francis T. Coppa; Patrick K. Patnode (57) ABSTRACT

A device for measuring at least one property of a material sample is disclosed. The device includes at least one sensor element which is formed by a direct-write technique. The device can be an instrument for measuring strain in the sample, or for measuring other properties or attributes of a sample, such as temperature. A turbine engine disk on which components of property-measuring devices have been direct-written is also described. Methods of forming sensor elements for property-measuring devices are disclosed.

13 Claims, 7 Drawing Sheets

DEVICES FOR EVALUATING MATERIAL PROPERTIES, AND RELATED PROCESSES

BACKGROUND OF THE INVENTION

This invention generally relates to materials characterization. More particularly, the invention is directed to methods and devices for measuring the physical properties of articles which may be used under variable conditions, in terms of temperature, stress, and the like.

Many types of materials are used commercially under a variety of conditions. Examples of such materials are polymers (e.g., plastics), ceramics, and metals. As a more specific illustration, many specialized metal components are used in a wide variety of industrial applications, under a diverse set of operating conditions. As an example, the various superalloy components used in turbine engines are exposed to high temperatures, e.g., above about 750° C. Moreover, the alloys may be subjected to repeated temperature cycling, i.e., exposure to high temperatures, followed by cooling to room temperature, and then followed by rapid re-heating.

Yet another example relates to structural components employed in the nuclear industry, e.g., components formed of stainless steel. These materials are often exposed to very aggressive environments, in terms of heat, corrosion, and the like, which can lead to various levels of cyclic or steady stress. The resulting occurrence is often referred to as "stress corrosion cracking" or "corrosion fatigue". Damage from stress corrosion cracking is of great concern, since material failure can be very unpredictable.

Clearly, methods for accurately and conveniently measuring the physical properties of these materials are critical for predicting their useful life. Some of the properties and attributes typically measured for material samples are as follows: material temperature, tensile characteristics (e.g., stress, strain), creep characteristics, fatigue, crack initiation and crack growth; and electrical resistivity.

Many different types of equipment and instrumentation can be used to determine these properties. For example, pyrometers, IR cameras, thermistors, and thermocouple thermometers are often used to determine the temperature of metal components like those described above. Extensometers and similar devices are often used to measure the absolute strain or creep in a metal component. Other strain-measuring devices are also used, e.g., bonded metallic strain gauges. Furthermore, various types of mechanical testing machines (e.g., constant displacement-rate types and constant load types) are used to carry out static tension and compression tests on metal components.

The measuring devices mentioned above are often quite suitable for carrying out tests on various test specimens (samples). However, there are some drawbacks associated with their use. For example, many of the devices rely in part on electrical connections to the samples, e.g., various wires which join portions of the samples to different locations on the devices. The electrical connections are often made by welding or brazing techniques. As an example, thermocouples are usually spot-welded to selected sites on a test specimen. These weld and braze connections can sometimes break, e.g., when the test specimen is subjected to high temperatures and/or rough handling.

Braze and weld connections may fail more frequently when the test specimens are subjected to a wide range of temperatures, e.g., about 150° F.-2300° F. (66° C.-1260° C.). Considerable care has to be taken to select the proper braze or weld material for a given temperature environment. Moreover, the connections sometimes have to be carried through fabricated openings in a furnace wall, which can be problematic.

Furthermore, the braze or weld connection may itself cause a disturbance on the surface of a test specimen, which adversely affects the test. For example, sensor wires are sometimes spot-welded on a metallic specimen, to monitor crack initiation and crack growth, e.g., as part of a tensile or fatigue test. The sensor wires are designed and emplaced to detect very minute cracks in selected surface regions (e.g., high stress regions)—usually by detecting changes in voltage or resistance. However, the bonding of the sensor wires to the surface may itself initiate or expand surface cracks, thereby invalidating the test.

Steps can be taken to minimize surface disturbance, e.g., by welding the sensor wires farther away from the region of interest. However, the relocation of the sensor wires may cause other problems. For example, space requirements along the specimen surface may make wire attachment more difficult. Furthermore, complicated adjustments may have to be undertaken to recalculate the stress-electrical equations, compensating for the new wire positions. Moreover, the accuracy of the test may still be compromised somewhat by the re-positioning of the sensor mechanism.

With some of these concerns in mind, new techniques and materials for measuring the properties and attributes of various samples and test specimens would be welcome in the art. New sensor materials—e.g., those which connect a test specimen to a particular type of measuring device—would be especially useful in situations where conventional sensor connections may cause the problems described above. Moreover, testing devices which include sensor materials whose size, shape, and composition can be readily adjusted would be of great interest in the art.

BRIEF DESCRIPTION OF THE INVENTION

One embodiment of this invention relates to a device for measuring at least one property of a material sample. The device comprises at least one sensor element which is formed by a direct-write technique.

Another embodiment is directed to a device for measuring strain in a material sample. The device comprises a conductor disposed on a support layer which overlies the material sample. The conductor can be energized with electric current, and can also communicate with a measuring device capable of detecting and measuring strain-induced changes in the electric current flowing through the conductor. At least one component of the device is formed by a direct-write technique.

Another embodiment relates to a strain gauge which comprises a metallic grid pattern deposited over a material sample by a direct-write process. The grid pattern is connected to a power supply so as to be capable of carrying an electrical current. The grid pattern also communicates with at least one mechanism capable of detecting and measuring resistance in the electrical current carried through the grid. A change in the electrical resistance is indicative of a change in the strain of the material sample.

A thermocouple device constitutes another inventive embodiment. The device is attached to a test specimen which can be heated to a temperature which is being measured by the device. The thermocouple device comprises a sensing junction in contact with the test specimen, and at least one reference junction. The junctions are connected in an electrical circuit with each other, and with an electrical measurement means. The electrical circuit comprises at least two metallic wires which are compositionally dissimilar from each other. The sensing junction of the thermocouple device is formed on a surface of the test specimen by direct-writing.

Another embodiment is directed to a turbine engine disk. The disk comprises a set of slots situated along the outer circumference of the disk, wherein each slot is capable of retaining a turbine blade. The disk also comprises a web region within a planar surface of the disk. A surface of the web region comprises at least one sensor element which is direct-written thereon.

An additional embodiment relates to a method of forming at least one sensor element for a device suitable for measuring at least one property of a material sample. A sensor element composition is applied on a surface of the material sample by a direct-write technique. The sensor element composition is then heat-treated with a focused energy source.

Still another embodiment is directed to a repair method for various measuring devices which contain one or more damaged sensor elements. The repair method comprises the step of replacing or modifying the sensor element by a direct-write technique, so that the device operates in the designated mode.

DETAILED DESCRIPTION OF THE INVENTION

As mentioned above, the device of this invention is one which can be used to measure the state or property of a material sample. As used herein, the term "property" is meant to include physical properties and mechanical properties. Non-limiting examples of such properties are as follows: fatigue, creep characteristics, crack initiation and growth (propagation); electrical properties (e.g., current, voltage, resistance, resistivity); and combinations of any of these properties. The "state" of a material is meant to refer to its condition (e.g., its attributes) at a given time. Examples include the temperature of the material, as well as its stress and strain characteristics. (For the purpose of simplicity, the term "property" is often used herein to refer to both the properties and the state of a sample).

The material sample is often in the form of some sort of test specimen or coupon, which can have a wide variety of shapes and sizes, and can comprise, for example, metals, metal alloys, ceramics, plastics, or combinations thereof. While the device often functions as a test specimen, it can also be used to measure the property of a material which is incorporated into any type of machine, engine, or other type of equipment. Thus, one or more of the properties mentioned above could be measured or monitored while the equipment is being operated, or in a non-operational mode.

The measuring device includes at least one sensor element, deposited by a direct-write technique which will be described below. As used herein, the term "sensor element" refers to any feature or component which is responsive to a physical stimulus, and which transmits a measurable impulse or signal as a result of that stimulus. Thus, the sensor element may be in the form of a conductor, e.g., an electrical or thermal conductor. Common examples include a very wide variety of electrical wires which carry current. Non-limiting examples of metals commonly used as conductors include copper, aluminum, platinum, rhodium, indium, and alloys which comprise substantial amounts of one or more of these metals. These wires may carry the current between any feature in the device and any attached component, e.g., a power source, an electrical detection component, a signal processor, and the like. (These attached features may be directly attached to the wire, or they may be indirectly attached). The term "sensor element" can also refer to any type of bonding site or joint between an end of a wire and some other portion of the device, or of attached equipment.

The sensor element can also be in the form of a variety of electrically non-conducting materials. Examples include ceramic or polymeric materials. Non-limiting examples of the polymeric materials include thermoplastic materials, thermosetting materials, and elastomeric materials (e.g., rubber compositions), or some combination of the foregoing. These materials may themselves be responsive to a physical stimulus, e.g., expanding in length or width under strain and/or temperature conditions. These materials may also be "responsive" when used in conjunction with one of the conductors mentioned above. For example (and as further illustrated below), a change in dimension of a non-conductive material may be detected by a change in the electrical characteristics of one or more attached electrical wires.

It should thus be understood that term "sensor material" is meant to include materials which may be used in conjunction with other materials, wherein the latter are actually responsive to the physical stimulus. For example, a metal conductor may be deposited onto one or more ceramic layers, which are in turn deposited on the surface of a test specimen. The ceramic layers may be used to support the metal conductor, and/or may be used for insulating the conductor from the substrate. As another example, electrically non-conductive layers, such as thermal barrier coatings (TBC's, which are usually ceramic themselves), may be deposited on top of conductive layers which are themselves applied over a substrate. These multi-layer structures are also considered to be "sensor materials". Many other variations in layer sequence are also possible. For example, the sensor materials can be applied between a bond layer and a subsequently-formed TBC.

An example of a device which can be made and used according to one embodiment of this invention is a thermocouple. As used herein, the term "thermocouple" is meant to define any temperature-measurement device which is based on the joining of two dissimilar metals. The operational principle is generally referred to as the "Seebeck Effect".

When the two dissimilar metals (e.g., metal wires) are joined to form a junction, and the opposite ends are joined to form another junction, and one junction is heated, a measurable voltage will be generated between the junctions. This voltage relates to the difference in temperature between the measuring junction ("sensing junction") and one or more reference junctions.

As those skilled in the art understand, many different types of thermocouples are available in the art. A key feature of each thermocouple is the type of conductor materials forming each pair of wires. Typical wire "couples" include the following, (although many others are possible): platinum and a platinum-rhodium alloy; copper and constantan; chromel and alumel; and iron and constantan. Selection of these materials depends on a variety of factors. Examples include the use-temperature of the thermocouple device; material expense; and the amount of voltage which can be developed with each material set. For example, platinum-rhodium alloys (Types R and S) may be used at very high temperatures, e.g., up to about 1500° C., while copper-constantan thermocouple pairs (Type T) are suitable for lower temperatures in oxidizing atmospheres, e.g., a maximum temperature of about 370° C. All of these materials can be deposited by direct-write techniques, as described below.

Figure 1:
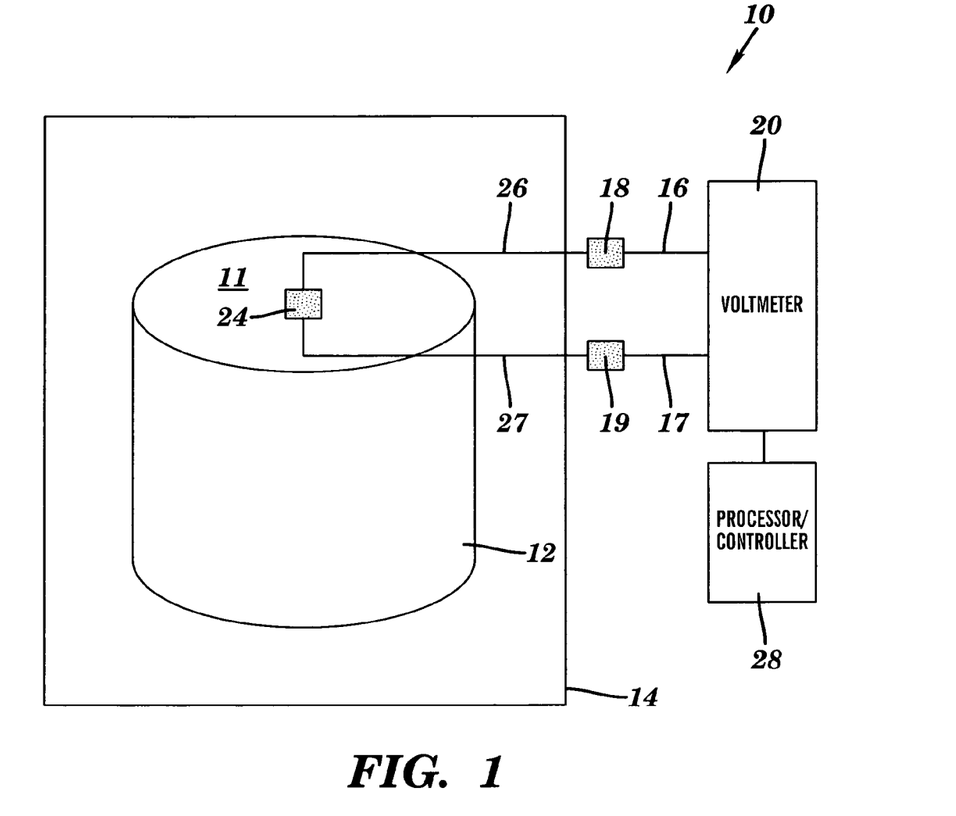
FIG. 1 is an illustration of a thermocouple device, attached to a test specimen.

FIG. 1 is a simplified illustration of a thermocouple device 10. The device is attached to a surface 11 of a test specimen 12. The specimen is depicted in the form of a cylinder, but can be in any suitable shape for performing the desired tests. In this instance, specimen 12 is positioned in a furnace/oven 14. (The size of the test specimen is exaggerated in the drawing, in order to more easily depict various features). Device 10 includes first wire 16, which is attached at one end to first reference junction 18, and at the other end to voltmeter 20. Second wire 17 is attached at one end to second reference junction 19, and at the other end to voltmeter 20. Third wire 26 is attached at one end to first reference junction 18, and at the other end to sensing junction 24. Fourth wire 27 is attached at one end to reference junction 19, and at the other end to sensing junction 24.

For such a thermocouple, wires 26 and 27 are made of dissimilar materials. Wires 16 and 17 can usually be formed of the same material when reference junctions 18 and 19 are maintained at the same temperature. The three junctions (18, 19 and 24) are depicted in simplified form. They may simply be welds or brazes between each wire. Sensing junction 24 is situated on the portion of surface 11 for which temperature is to be measured. (The surface remains hot while the temperature is being measured). Reference junctions 18 and 19 are maintained at a constant, lower temperature, according to the conventional operation of devices of this type. Thus, in this embodiment, they are situated at some location outside of oven 14.

According to an embodiment of the present invention, sensing junction 24 can be formed by the direct-write processes described below. Usually (but not always), direct writing for this type of deposition takes place at room temperature. A lower temperature treatment (e.g., about 250° C. to about 350° C.) could then be carried out, to provide a more robust connection. This preliminary heat treatment is usually sufficient to remove the polymeric additives in the ink or paste used in the direct write process. As an alternative, or in addition to the preliminary heat treatment, the substrate could itself be heated, during or after the direct write process, to aid in the removal of these additives. As also described below, a high-temperature heating step is usually carried out subsequently, to provide better curing and/or powder sintering. In the case of the thermocouple wires, sintering of the metal powder greatly improves electrical conductivity at the junctions.

Moreover, junctions 18 and 19, as well as each of the wires 16, 17, 26 and 27 (or portions of the wires), can also be formed by direct-writing. The portions of the wires which overlie specimen surface 11 can be direct-written on the surface. The portions of wires 26 and 27 which extend from the specimen surface to the respective reference junctions can be direct-written onto a separate, removable substrate. The removable substrate (e.g., one made of Mylar® film) could then be detached, leaving the desired connection in place. In a similar fashion, wires 16 and 17, as well as junctions 18 and 19, can be formed. (In some cases, the removable substrate does not have to be detached from the features formed thereon, as long as the device can still be operated in the intended manner).

It can be seen from FIG. 1 that the thermocouple device includes an electrical circuit between the wires, junctions, and voltmeter. Heating of the specimen in oven 14 results in a temperature difference between junction 24 and junctions 18 and 19. As those skilled in the art understand, the temperature difference in turn results in an electromotive force (EMF) which is approximately proportional to the difference between the temperatures at the junctions. The EMF can be measured and recorded by a variety of techniques, and the temperature at the sensing junction can readily be calculated from the EMF reading.

In FIG. 1, voltmeter 20 and processor/controller 28 are depicted (in very simplified form) within the thermocouple circuit. However, it is well-understood that thermocouple devices can also include a variety of other features. Some are described in "The Art of Electronics", by P. Horowitz et al, Cambridge University Press, 1980 (e.g., pp. 591-608), which is incorporated herein by reference. For example, they may incorporate a compensation circuit, which automatically corrects for differences caused by fluctuations in the pre-set reference junction temperature. Moreover, many other adjustments can readily be made to the device, depending on a variety of operational requirements. Some of the adjustments involve the following aspects: wire size, wire composition, and the specific location of the wires and sensors. The direct-write technique can greatly facilitate these adjustments.

As an alternative to hard wire connections, the thermocouple signal can be transmitted wirelessly from the junctions to the voltmeter. Those skilled in the art are familiar with wireless telecommunication links of this type. As an example, the use of a wireless device for remotely monitoring a condition within a component of a turbine engine (e.g., a turbine blade) is described by C. Hardwicke et al, in U.S. Patent Application Publication US 2004/0101022A1, published on May 27, 2004, and incorporated herein by reference. The signal for the wireless communication link can be carried in a variety of forms, such as radio frequency, microwave, and the like.

In the present instance, an antenna could be incorporated into the thermocouple device of FIG. 1, e.g., attached, directly or indirectly, to voltmeter 20. The antenna could also be formed by direct-writing, as mentioned below. Its use could eliminate the need for wire connections 16 and 17. Various features associated with the use of such a wireless connection are also mentioned in Publication 2004/0101022A1, and described in other sources. For example, ancillary devices for receiving signals, converting them to data, and processing that data, can all be incorporated into the thermocouple instrument without undue effort.

Other embodiments of the present invention are directed to devices which measure dimensional changes in a test specimen, e.g., changes caused by strain. As used herein, "strain" is the amount of deformation of a body due to an applied force. The applied force may be temperature- or pressure-induced. The term "strain" is said to include both tensile and compressive strain, and strain gauges can be used to detect expansion as well as contraction. Strain is often expressed as a fractional change in the length of a sample, or a portion of that sample. Experimental stress analysis utilizes the strain values measured on the surface of a specimen or structural part. In this manner, the stress in the material can be determined, which can serve as a prediction of the integrity of the part.

Devices of this type may be relatively simple. One non-limiting illustration is provided in FIG. 2, which depicts the surface 40 of a test specimen 42. A non-conductive layer 44, e.g., one formed of a polymeric or ceramic material, is deposited on surface 40 by a direct-write process. (Layer 44 could be a thermal barrier material). A conductor 46, e.g., a wire, is deposited over layer 44—also by direct-writing, if desired. Wire 46 can be attached to any electrical measurement means (not shown) which is capable of measuring resistance in the wire, or a change in its resistance. The wire typically has some sort of undulating shape, such as that shown, which can improve the resolution of the strain measurement. However, the wire could be straight as well. Connectors (leads) 48 and 50, which are also conductive, are usually connected in circuit (e.g., a Wheatstone Bridge circuit) with an appropriate electrical power supply, which is not shown. Connectors 48 and 50 also serve to connect wire 46 to the measurement means (e.g., a signal recording device such as a galvanometer, oscilloscope, or similar type of device), which also does not need to be depicted here. These connectors can also be formed by direct-writing. Moreover, the device may include other conventional features as well, e.g., a display component.

Figure 2:
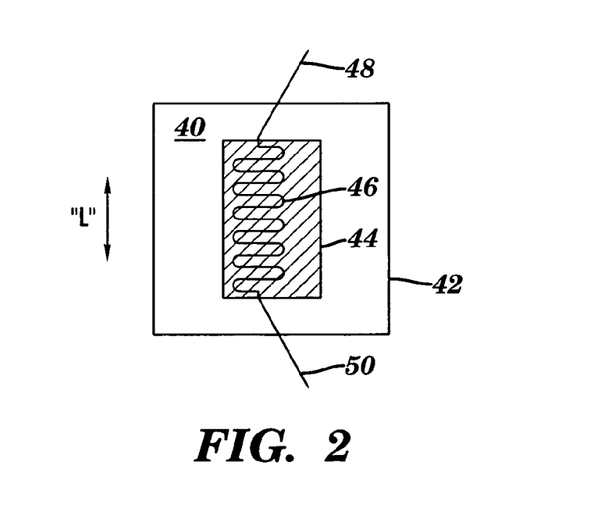
FIG. 2 is an illustration of a strain-measurement device.

When a load is applied to test specimen 42 (e.g., by way of increased temperature), its dimension may change as a result of strain in the specimen. For example, the specimen may expand in the length ("L") direction, as shown. This expansion would cause layer 44 to also expand. In turn, energized wire 46 will expand or break, thereby altering its resistance, or breaking the circuit. Any change in the condition of wire 46 is immediately detected by the signal recording device. Common calibration and/or conversion mechanisms convert these changes to a measurement of strain in specimen 42. (Those skilled in the art understand that the signal recording device can comprise various measurement mechanisms which detect any electrical property, e.g., voltage, current, resistance, or resistivity. Thus, the mechanism could include a voltmeter, ammeter, and the like). The device illustrated in FIG. 2 is particularly useful for very localized strain measurements, although it can be used in many different situations.

Figure 3:
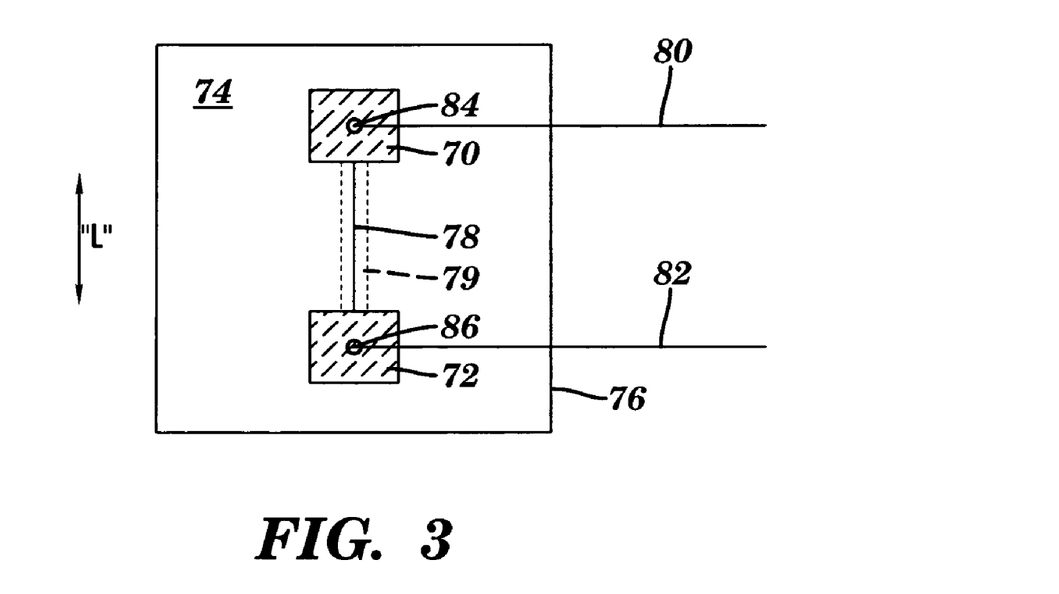
FIG. 3 is an illustration of another type of strain-measurement device.

Another exemplary device for measuring strain is depicted in FIG. 3. Deposits or pads 70 and 72 can be applied onto surface 74 of specimen 76 by a direct-write process. The deposits usually comprise a non-conductive material, as described previously, and may be formed in a variety of shapes and sizes. The deposits bridge or "span" an area of interest on surface 74. Wire 78, which can also be direct-written, connects pads 70 and 72. When surface 74 is metallic or otherwise conductive, wire 78 is preferably insulated from the surface by some type of underlying insulating layer 79, which can also be direct-written, prior to formation of the wire. The insulating layer need not be present when surface 74 is non-conductive. Moreover, as in other embodiments, wire 78 can be in any shape, e.g., undulating, as in FIG. 2.

With continued reference to FIG. 3, wires 80 and 82 extend from pads 70 and 72, respectively. Each wire can be attached, directly or indirectly, to a suitable measuring device (not shown), such as a voltmeter, as well as to the other conventional equipment described previously. Elements 80 and 82 can be conventional wires, or they can be formed—fully or partially—by direct write processes. For example, as described previously for other embodiments, the portions of the wires that overlie surface 74 can be direct-written onto the surface. The free-standing portions of the wires can be direct-written onto a separate, removable substrate, and then fused (e.g., by welding or brazing) or connected in some other way to the ends of the wires which overlie surface 74. Furthermore, as in FIG. 2, this strain gauge is connected into an electrical circuit by any conventional technique. For example, wires 80 and 82 can be connected to a conventional power supply.

Many techniques are available for connecting wires 80 and 82 to wire 78. Each connection site 84 and 86 is depicted as situated in the center of pads 70 and 72, respectively, although connection could be made on any portion of the pad. The wire ends could be conventionally fused at each connection site. Alternatively, if wires 80 and 82 are direct-written, the direct-write deposit can simply be extended to a point where contact with each end of wire 78 is made, followed by a heat-treatment step described below. Thus, connection sites 84 and 86 could simply be fused contact points. In some cases, the contact sites could also include openings in pads 70 and 72, which expose underlying, conductive regions of surface 74. These openings may assist in establishing a firm electrical connection. The openings could be formed by a conventional technique such as drilling, or by simply incorporating such an opening into the direct-write pattern when each pad is formed.

As in the case of the embodiment of FIG. 2, a force applied to specimen 76 in FIG. 3 will result in a dimensional change in the length (L) of the specimen. For example, expansion of the specimen will cause the distance between deposits 70 and 72 to increase. This in turn results in a change in the length or condition of wire 78, thereby altering its resistance. Measurement and interpretation of that change (via wires 80 and 82) by the associated measuring device results in the desired strain-determination. Stress calculations can be made by using the strain values, based on Hookes's Law.

It should be understood that wires 80 and 82 would not be necessary if the electrical measurement for strain is transmitted by wireless means. For example, a suitable antenna could be incorporated into the device (e.g., as part of the measuring device), to receive a transmission of the electrical strain measurement. The antenna (not shown) could also be formed by direct-writing (as further described below), and could be situated at an appropriate location on surface 74. (As those skilled in the art understand, another antenna could be attached to a receiver which is associated with the signal measuring device). Moreover, if wires 80 and 82 are absent, other methods to energize the electrical circuit for the strain device could be readily devised. The device illustrated in FIG. 3 is useful for measuring strain over a larger area than for the device of FIG. 2, although this device can be used in many different situations as well.

Figure 4:
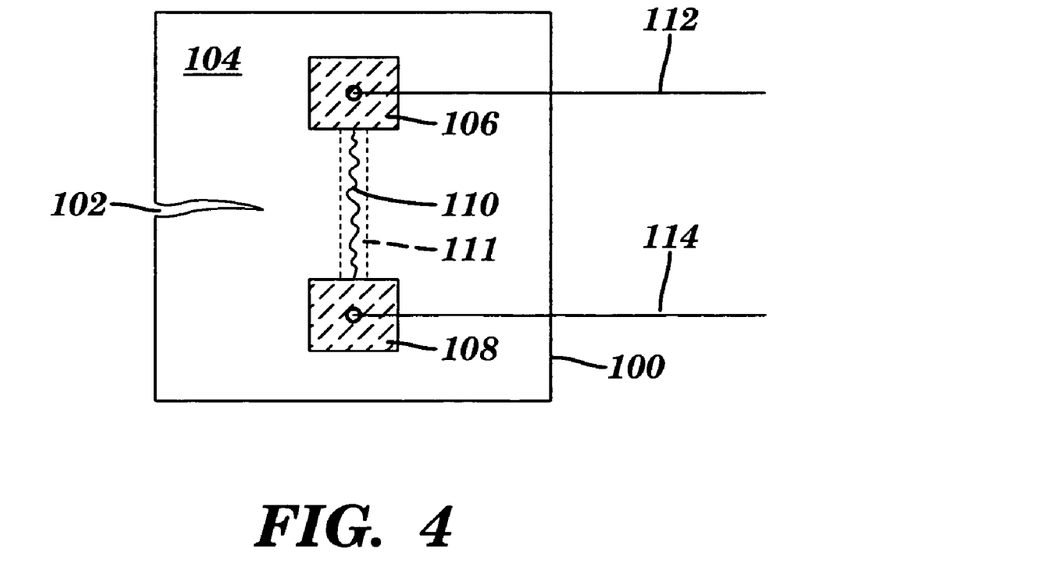
FIG. 4 is an illustration of a strain-measurement device for measuring crack initiation or crack growth.

FIG. 4 depicts a test specimen 100, which can be formed of a variety of materials. Non-limiting examples are stainless steel, titanium, or superalloy materials. As mentioned above, such materials are often used to form components exposed to very harsh conditions, e.g., high temperature and corrosive environments. (The components can be covered by one or more protective coatings, e.g. oxidation-resistant metallic coatings or thermal barrier coatings). A crack 102 is depicted in the surface 104 of the specimen. While the crack is given a dimension suitable for illustration, it should be understood that the crack may be extremely small—perhaps not even detectable by the human eye. For example, the crack may be in the form of a starter flaw in a high-stress area of the specimen. It could be a stress corrosion crack (SCC), resulting from cyclic or steady stress.

As in the embodiment of FIG. 3, pads or contact points 106, 108, could be deposited by a direct-write technique, on each side of the crack, or across a selected area where crack initiation and growth are expected. One or more wires/conductors 110 which connect the contact points over the area of interest could also be deposited by direct-write techniques. Although conductor 110 is depicted as undulating in FIG. 4, the wire could be straight, or in other shapes, as mentioned previously. If surface 104 is conductive, wire 110 is usually insulated from the surface by some type of underlying insulating layer 111. Layer 111 can also be direct-written, prior to formation of the wire.

Wires 112 and 114 extend from pads 106 and 108, respectively. Each wire can be attached, directly or indirectly, to a suitable measuring device (not shown), such as a voltmeter. Attachment is also made to the other conventional equipment described previously, e.g., a power source for energizing the circuit formed by the wires. As in the case of FIG. 3, these wires can be conventional wires, or they can be formed—fully or partially—by direct write processes. Moreover, the wires would not be necessary if a wireless connection were established between pads 106, 108, and the measuring equipment.

As in the other embodiments, any designed stress placed on specimen 100 can result in strain which initiates crack 102, or expands a previously-formed crack at that site. Often, the designed stress might be induced by furnace-cycling of the specimen. The strain usually increases the distance between contact points 106 and 108, thereby changing the resistance of wire 110, as described previously. The change in resistance is measured by the appropriate device, and the resulting value can provide an extremely accurate measurement of crack growth—even minute growth.

Moreover, the flexibility of the direct-write processes permits rapid changes in the position of the contact points for specimen 100. (Adjustment of those positions may sometimes be desirable to adjust the strain-voltage parameters in a given situation, for faster or more reliable crack-growth detection). Similarly, direct-write techniques allow one to quickly change the composition of conductor 110, or of the contact points, if such a change makes the test-analysis easier or more reliable. For example, other compositions might be used on a set of different test specimens, depending on changes in temperature or environmental conditions for the specimens.

Many embodiments of the invention, e.g., those depicted in FIGS. 2-4, relate to property measurement for metal samples, e.g., superalloys or the other metallic materials described above. However, it should be emphasized that properties can also be measured for non-metallic materials. Examples include various plastic or ceramic components, or plastic or ceramic coatings (e.g., thermal barrier coatings) which are applied over various components. As a non-limiting example, conductive wires could be deposited by direct-writing onto the non-metallic surface, so as to measure strain or other properties, in the manner described above. In these instances, the need for a base material which provides electrical insulation between the wires and the non-conductive specimen (i.e., the substrate or coating) would not be present, unless the specimen might become conductive, e.g., at very high temperatures.

Moreover, the conductive wires which are direct-written for various embodiments are usually metallic. However, those skilled in the art understand that the wires could be ceramic-based as well. Non-limiting examples include various types of silicon carbide materials which have the capacity to carry electrical current at high temperatures.

A variety of other types of strain gauge devices can also include sensor elements which are formed by a direct-write technique. Most of the gauges are based on the measurement of strain-induced electrical resistance, although devices which are based on capacitance or inductance are also known in the art. Non-limiting examples of these strain gauge types are: (1) adhesive bonded metallic foil element; (2) semiconductor wafers made of resistance elements diffused into a substrate and adhesively bonded thereto; (3) thin-film elements molecularly bonded to a ceramic layer which is deposited on the test specimen; and (4) diffused semiconductor elements. Features such as wires, contact points, and the like, in each of these types of strain gauges, can be advantageously formed by direct-writing. In many instances, the devices may have greater durability and greater potential for re-use, due in part to the bonding strength of the components which are direct-written. These attributes are especially important when the devices are used in the harsh conditions noted previously.

Figure 5:
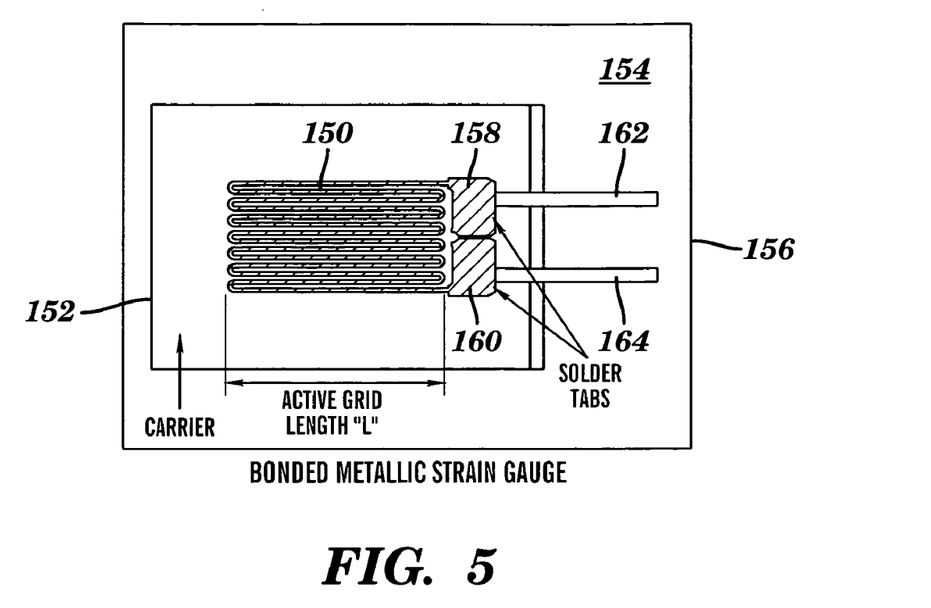
FIG. 5 depicts a bonded metallic strain gauge in accordance with some embodiments of this invention.

One commonly-used type of device is the bonded metallic strain gauge, generally depicted in FIG. 5. A grid pattern 150, usually formed of very fine wire or metallic foil, is disposed on a backing or "carrier" 152. Carrier layer 152 is often formed of a polymeric material, although it would preferably be a ceramic-type material if the gauge is being used at very high temperatures. Grid pattern 150 is usually bonded to carrier 152 with an adhesive (not shown). The carrier is in turn attached to a surface 154 of test specimen 156. (As those skilled in the art understand, the carrier and the adhesive are made of compatible materials which permit consistent transmission of the strain from the specimen to the grid. The matrix can also serve as an electrical insulator and a heat dissipator).

Connectors 162 and 164 usually attach the grid assembly, directly or indirectly, to conventional sensing mechanisms and recorder/displays (not shown). Electrification of the strain gauge can also be made through connectors 162 and 164. Solder tabs 158 and 160 attach the corresponding connector to the outside features of the device, although other types of attachment are possible. The sensing mechanism and recorder/displays may include one or more conventional computer processors.

The grid pattern 150 is designed to maximize the amount of wire or foil which is subject to strain in the parallel direction, i.e., along grid length "L". (Alignment marks, not shown here, are usually made on the surface of the carrier, to properly align the position of the grid pattern). The cross-sectional area of the grid is usually minimized to reduce the effect of shear strain and Poisson Strain. According to the present invention, carrier 152 can be formed by a direct-write process. Moreover, the entire grid pattern 150 can be formed by direct-writing, as can optional solder tabs 158, 160, and connectors 162, 164. Adhesives which are sometimes used to bond the grid to the carrier can also be formed in this manner. Direct-writing allows for maximum accuracy in the pattern of the grid, thereby promoting very accurate electrical measurements when the particular strain test is being undertaken.

Other details regarding the function of the strain gauge of FIG. 5 are well-known in the art. When any type of stress (e.g., by temperature-cycling) is placed on test specimen 156, the resulting strain is transferred from the specimen, through the carrier, to energized grid pattern 150. Typically, the resulting change in electrical resistance is measured and recorded by the sensing mechanism and recorder/displays attached to connectors 162 and 164. However, it is again emphasized that strain gauges like that of FIG. 5 can vary widely in structure, shape and function, while still being within the scope of these teachings.

Figure 6:
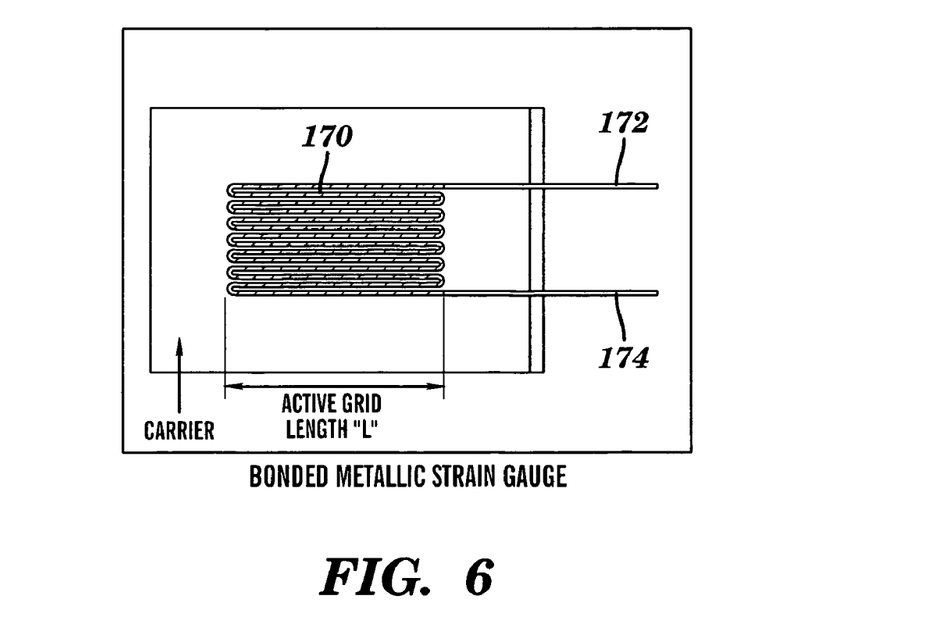
FIG. 6 depicts another bonded metallic strain gauge in accordance with some embodiments of this invention.

The flexibility of the direct-write process for instrumentation allows for useful modifications of the embodiment of FIG. 5. FIG. 6 depicts one such alternative. (Features not specifically labeled in FIG. 6 are identical to those of FIG. 5). In this embodiment, connectors 172 and 174 can be in the form of direct-written wires which simply extend from portions of grid pattern 170. Thus, the solder tabs used in FIG. 5 are not necessary. Wires 172 and 174 could be the same composition as that of the grid. However, since their function (i.e., a conductive connection) is different from the strain-sensing function of the grid, the composition of the wires would typically be different as well. As further described below, grid 170 and wires 172, 174 could be direct-written in a continuous or nearly-continuous process, by changing the feed material for the direct-write instrument. As in other embodiments, the wires would usually connect the grid assembly with some type of sensing mechanism and recorder/display.

Other devices typically used in materials testing can also include sensor elements which are formed by a direct-write technique. Non-limiting examples include various mechanical testing devices. Many of these devices fall into three categories: constant load, constant load-rate, and constant displacement-rate types. Those skilled in the art are familiar with the construction and operation of these types of devices.

Moreover, devices which are formed by the direct-writing of sensor elements could be incorporated into an environment being monitored, without necessarily being attached to a substrate in that environment. As an illustration, the device could be situated within the path of fluid flow through the various passageways of a turbine engine, measuring gas temperature, pressure, speed, and the like. As one non-limiting example, a thermocouple could be formed on any type of detached substrate (i.e., not on a turbine surface), which is then suspended within an appropriate passageway within the turbine.

Direct-write techniques which are used in this invention to form sensor elements are known in the art, and described in many references. Examples include U.S. Pat. No. 6,660,680 (Hampden-Smith), which is incorporated herein by reference. An instructive text is also available: "Direct-Write Technologies for Rapid Prototyping Applications", edited by A. Pique and D. B. Chrisey, Academic Press, 2002. In many embodiments, direct-write techniques have significant advantages over other techniques which can be used to form sensor elements. For example, the direct-write process does not require the formation of grooves in an underlying substrate or coating surface (and can in fact be used to fill in grooves which are no longer needed or desired). Direct-write processes also have advantages over physical vapor deposition (PVD) techniques. In many cases, PVD can be time-consuming and expensive, due in part to the required equipment, e.g., for maintaining a vacuum. Moreover, PVD techniques often require meticulous surface preparation, to ensure proper adhesion of the deposited material to the surface.

Most direct-write techniques usually involve the suspension of a deposition material (or a precursor to that deposition material) in a liquid medium, or some other type of fluid medium. The suspended material is usually (but not always) in the form of fine particles. In some instances, aerosols are used as the suspension medium. The writing technique is typically carried out by ejecting the liquid through an orifice toward the surface, using a suitable direct-write tool. Usually, the tool itself does not make substantial contact with the surface. The direct-write tool is preferably controllable over an x-y-z grid relative to the printed surface (i.e., either or both the substrate and the device may move). Moreover, the direct-write tool can be used to readily apply the sensor element on curved or irregular substrates, as well as flat surfaces.

In general, the deposition materials for direct-write techniques can include a wide variety of metal, ceramic, or polymeric powders. In the present instance, the deposition material will of course depend on the desired material for the sensor. Frequently, the powder is uniformly distributed in a solvent, forming a slurry (often referred to as an "ink" or "paste" in the jargon for direct-write processes). Various additives may also be present. For example, different types of surfactants can be added to impart suitable flow characteristics to the slurry. Moreover, binders such as starch or cellulose are also frequently used to enhance the integrity of the deposited material, prior to a subsequent heat treatment. The slurry can have a range of viscosities, e.g., from water to tar, depending on various factors. Those factors include the type of direct-write technique employed; and the types of features being formed, e.g., their size, shape, and required integrity. The slurry or ink is applied directly onto any type of substrate, in an automated technique. Usually, a CAD/CAM interface is employed to program a desired pattern for the deposition.

Many of the general details regarding slurry formation are known in the art and need not be described extensively here. Reference is made to various sources for ceramics processing, such as the "Kirk-Othmer Encyclopedia of Chemical Technology, 4th Edition, Vol. 5, pp. 610-613", and U.S. Pat. Nos. 6,613,445 and 5,985,368 (both to Sangeeta et al, and incorporated herein by reference). Moreover, the direct-write text mentioned above (Pique and Chrisey) describes many of the desirable characteristics for direct-write ink and paste formulations.

In brief, the slurry is preferably well-dispersed and free of air bubbles and foaming. It has suitable rheological properties adjusted in accordance with the requirements for the particular direct-write technique to be employed. (For example, a ceramic slurry is often provided with the consistency of toothpaste when various pen techniques are used, as described below). Preferably, the solid particle settling rate in the slurry should be as low as possible. The slurry should also be chemically stable. Furthermore, when dry, the deposited material should retain its shape on the substrate, or on layers deposited on the substrate, and should possess sufficient strength for subsequent steps, e.g., finishing and handling before firing.

A wide variety of additives can be present in the slurry, to provide the necessary characteristics. Non-limiting examples (in addition to the binders and surfactants mentioned above) include: thickening agents, dispersants, deflocculants, anti-settling agents, plasticizers, emollients, lubricants, surfactants and anti-foam agents. Those skilled in the art will be able to select the most appropriate level of any additive used, without undue experimentation. The slurry can be prepared by any conventional mixing technique. Non-limiting examples include the use of high-speed blenders, ribbon blenders, rotating canisters, and shear mixtures, e.g., a roll mill; as well as ultrasonic agitation.

As alluded to previously, the direct-write techniques which can be used for this invention are known in the art. For example, the thermal spray techniques, which are often used for direct-writing of ceramic materials, are derived from conventional processes, as described in the Pique/Chrisey text (e.g., pp. 265-293). Non-limiting examples include high velocity oxy-fuel (HVOF) techniques, and plasma processes, such as vacuum plasma deposition (VPS). HVOF is a continuous combustion process in which the powder is injected into the jet stream of a spray gun at very high speeds. Those of ordinary skill in the art are familiar with various HVOF details, such as the selection of primary gasses, secondary gasses (if used), and cooling gasses; gas flow rates; power levels; coating particle size, and the like.

In a typical plasma process, a generic DC (direct current) thermal plasma torch is employed, providing a stable electric arc between a cathode and an annular, water-cooled copper anode. A plasma gas (often argon or another inert gas) is introduced at the back of the spray gun interior. The gas swirls in a vortex, and then exits out of the front of the anode nozzle. The electric arc from the cathode to the anode completes the electric circuit, forming an exiting plasma flame.

As those familiar with plasma spray technology understand, plasma temperatures can be very high, e.g., 15,000 K for a conventional DC torch operating at 40 kW. The material (e.g., ceramic) which is deposited on the substrate is usually supplied in powder form. The powder is introduced into the plasma flame. The powder particles are accelerated and melted in the flame, on a high-speed path to the substrate, where they impact and undergo rapid solidification. Those skilled in the art are familiar with variations in the general plasma spray process, and familiar with techniques for adapting the process to a variety of deposition materials. In the present instance, the plasma processes and other thermal spray techniques are modified to provide a computer-interface. Processes of this type are generally described, for example, in U.S. Pat. No. 6,576,861, which is incorporated herein by reference.

Another suitable direct-write technique is Laser Chemical Vapor Deposition (LCVD), also described in the Pique/Chrisey text. LCVD is a thermal technique for film growth. In brief, a laser is employed as an activator of a precursor for the deposition material that is photolyzed, pyrolyzed, or vibrationally/rotationally excited. The technique can be used to form complex structures on the substrate, by "mass-addition". The material deposition can be carried out under computerized motion control, as in other direct-write processes. U.S. Pat. Nos. 5,154,945 and 5,060,116 also discuss various aspects of LCVD, and are incorporated herein by reference.

Another very common direct-write process is based on ink-jet techniques. These techniques are described extensively in the Pique/Chrisey text (e.g., Chapter 7), and in many other references, e.g., the "Kirk-Othmer Encyclopedia of Chemical Technology", 4th Edition (1996), Vol. 20, pp. 112-119. Various ink jet systems can be employed, e.g., continuous mode systems and demand-mode (e.g., impulse) systems. Within the latter category, there are various types of impulse systems as well, e.g., piezoelectric systems and thermal impulse systems. The electronic control mechanisms for ink jet systems are also well-understood in the art. Various computer-control systems can be employed, e.g., using a CAD/CAM interface in which the desired pattern of deposition is programmed.

Those skilled in the art are familiar with the requirements for ink compositions, which can usually be aqueous or solvent-based. In addition to some of the additives mentioned above, ink jet compositions may contain other ingredients which are somewhat particular to this deposition method. For example, humectants and selected co-solvents may be use to inhibit drying of ink in the nozzles. The composition of the slurries used according to this disclosure can be readily adjusted to be compatible with ink jet deposition.

Yet another direct-write process which can be used for this invention is laser-guided direct writing (LGDW). In a typical process of this type, a stream of deposition particles is produced, as described in the Pique/Chrisey text (e.g., pp. 10 and 646-648). The particles are constrained by a laser beam, and directed onto a selected region of the substrate. The particles often originate as suspensions, e.g., a suspension in water. In some instances, ultrasonic atomization is used to spread the particles in the atmosphere, for contact with the laser beam.

Laser particle guidance systems and related details are also described in U.S. Pat. Nos. 6,636,676 and 6,268,584, which are incorporated herein by reference. As described in the latter patent, the laser particle guidance systems typically include various positioning mechanisms, which are computer-driven to direct the pattern of deposition. Some of the LGDW systems are commercially available from Optomec Design Company, Albuquerque, N. Mex.

The "MAPLE" technique is another example of a direct-write process suitable for the present invention. (The acronym corresponds to "matrix assisted pulsed laser evaporation"). The MAPLE technique is described in considerable detail in the Pique/Chrisey text (e.g., pp. 138-139; 521 et seq.). The technique is also described in U.S. Pat. Nos. 6,660,343 and 6,025,036, both incorporated herein by reference.

In brief, MAPLE uses a focused ultraviolet laser pulse to transfer material from a coating on a carrier, onto a substrate. In one type of MAPLE system, the laser impacts the material to be transferred from the back at the carrier-material interface, through the carrier (which is usually transparent). The material is designed to absorb the laser energy, causing local evaporation at the interface. Discrete "packets" of the deposition material are thus propelled toward the substrate, according to a computer-controlled pattern. By using a sequence of laser pulses while moving one or both of the carrier and the substrate, a desired pattern can be directly written.

Those skilled in the art will be able to adjust the characteristics (e.g., particle size and rheology) of the deposition material used herein, to be compatible with the MAPLE process. Various other process parameters can also be adjusted by those familiar with MAPLE. Examples of the parameters include incident beam energy, pulsed laser rate, and the like.

Pen-dispensing systems represent another class of direct-write techniques. The systems often use automated syringes, and are sometimes generally referred to as "micropen printing" processes. The referenced Pique/Chrisey text provides a general description of these systems (e.g., chapter 8); they are also mentioned in the above-referenced Hampden-Smith patent. Some of the process factors mentioned above are relevant here as well, such as the rheology of the printing paste or ink, as well as its wetting and adhesion characteristics. Commercial pen-dispensing systems are available from various sources. For example, the Micropen™ tool is available from Ohmcraft, Inc., of Honeoye Falls, N.Y. The Dotliner™ dispense system is available from Manncorp, Huntingdon Valley, Pa. Sciperio, Inc., of Stillwater, Okla., offers similar types of systems.

An exemplary pen-type deposition process is described in a co-pending application for R. Bunker et al, Ser. No. 10/611,745 filed on Jun. 30, 2003. That patent application is incorporated herein by reference, and one non-limiting embodiment is depicted here in FIG. 7. A mixture 200 of the deposition material is delivered through a nozzle or "pen" 202 onto surface 204 of test specimen/work-piece 206. The composition of the mixture will depend on the required composition for the sensor material. Thus, in some embodiments, mixture 200 is a ceramic slurry, comprising ceramic powder 207 dispersed in a liquid medium 208. (As mentioned above, the viscosity of the slurry is sometimes very high).

Figure 7:
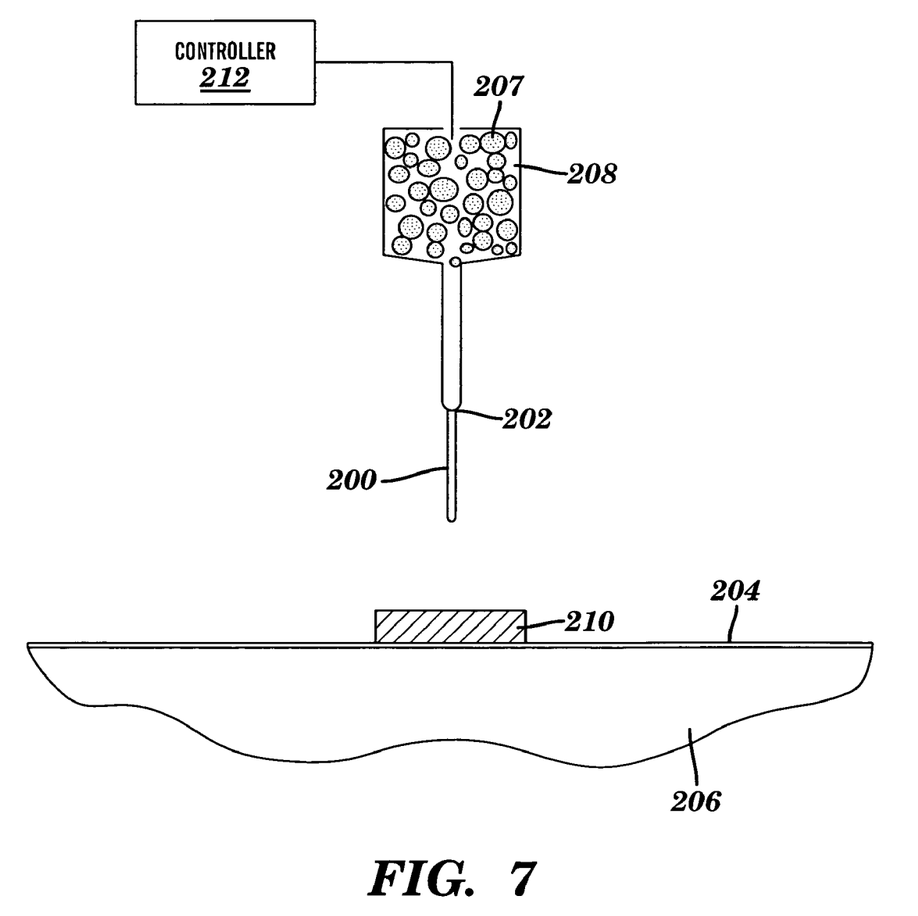
FIG. 7 is a general illustration of a direct-write pen system used in the formation of sensor elements for embodiments of this invention.

In other embodiments, the mixture comprises one or more metal powders, suspended in a liquid. Alternatively, the mixture may comprise, for example, a polymeric composition. The polymeric composition could be a thermoplastic material which remains in substantially liquid form at elevated temperatures. As another alternative, the polymeric composition could be a monomeric material which remains in liquid form until polymerized by heat and/or the action of a catalyst.

Mixture 200 is forced through nozzle 202 at a controlled rate, to achieve a desired shape and size for positive feature 210, i.e., a sensor element. One or more passes with the pen may be made on the surface. The size of the orifice of the nozzle (along with other factors mentioned below) is selected to provide a desired dimension for each pass.

During deposition of the material, nozzle 202 is displaced relative to surface 204, so as to form sensor element 210 with a pre-determined shape. (As alluded to above, the pre-determined shape is generated and stored in a computer e.g., as a CAD/CAM file). The "displacement" is carried out by moving the nozzle or the specimen surface, or moving both, with computer control. An exemplary controller is generally depicted as element 212. The height and shape of the features deposited on the substrate surface are determined in part by the flow-rate of the dispensed material stream, and the relative speed of movement between the pen tip and the work-piece during the writing operation.

Another pen system for effectively applying sensor material to a substrate is described in a co-pending application for S. Rutkowski et al, Ser. No. 10/622,063, filed on Jul. 17, 2003, which is incorporated herein by reference. The system, colloquially referred to as a "robotic pen", is computer controlled. It includes a multi-axis stage for mounting a work-piece, and a cooperating elevator for providing vertical motion to the work-piece. Usually, the pen tip is rotatably mounted to the elevator. A dispenser for providing the deposition material is joined in flow communication to the pen tip. The dispenser ejects a stream of material to the surfaces of the work-piece as the work-piece moves relative to the pen.

The robotic pen system illustrated in application Ser. No. 10/622,063 is an assembly of primarily conventional components suitably modified in a collective apparatus or system for writing with precision on the various surfaces of the core. (Such a system can be obtained by modifying a commercially-available milling machine, e.g., a complex multi-axis computer numerically controlled (CNC) machine). The robotic pen system is especially useful for applying the sensor material to substrates (e.g., test specimens) with considerable curvature, or to substrates having a complex surface profile.

After the sensor material has been applied to the surface of the substrate, a heat treatment is carried out to remove any volatile substances (such as binders, solvents, and the like), and to consolidate and strengthen the material. In some instances, the deposited material can be heat-treated by itself or with the substrate (e.g., the entire test specimen). Exemplary heat treatments include focused energy sources such as plasma, laser, electron beam-heating; or heating with some other local source. Alternatively, the heat treatment can be carried out in a furnace if the temperature is low enough to avoid damage to the substrate. The heat treatment can be carried out at a pre-set, "firing" temperature, or according to any graduated schedule. Moreover, when the material has been deposited in more than one layer, heat treatments can be carried out between each deposition.

The heat treatment temperature and time will depend on various factors, such as the type of material deposited, and its dimensions, as well as the composition of the substrate. In the case of depositing ceramic materials like those described above (e.g., alumina- or alumina/silica-based), the heat treatment schedule is one sufficient to burn out the volatile components, while also promoting consolidation. The latter phenomenon is known to those skilled in the art, and usually involves inducing the ceramic powder grains or particles to undergo inter-particle sintering mechanisms which bond the grains or particles to one another, and to the substrate material. The heating temperature for ceramic materials is typically in the range of about 1000° C. to about 2000° C. However, this range may vary considerably, and may also include lower-temperature stages to primarily remove the volatile material.

Metals are usually sintered at a temperature which is about 60% to about 70% of their melting point, although the sintering temperature can vary substantially. The heat treatment temperature for polymers will depend in large part on the particular polymer used. Usually, the polymer heat treatment is in the range of about 25° C. to about 250° C.

As mentioned above, the sensor material may comprise multiple layers deposited over the substrate. Most or all of these layers can be formed by the direct-write technique. As an illustration, an oxide material may be deposited directly on a nickel superalloy substrate, serving as a physical support, and or as an electrical/thermal insulator. Non-limiting examples of the common oxide materials are magnesium oxide, aluminum oxide, and silicon dioxide. Magnesium oxide is especially useful because it exhibits a good thermal-expansion match with the nickel-based substrate.

Figure 8:
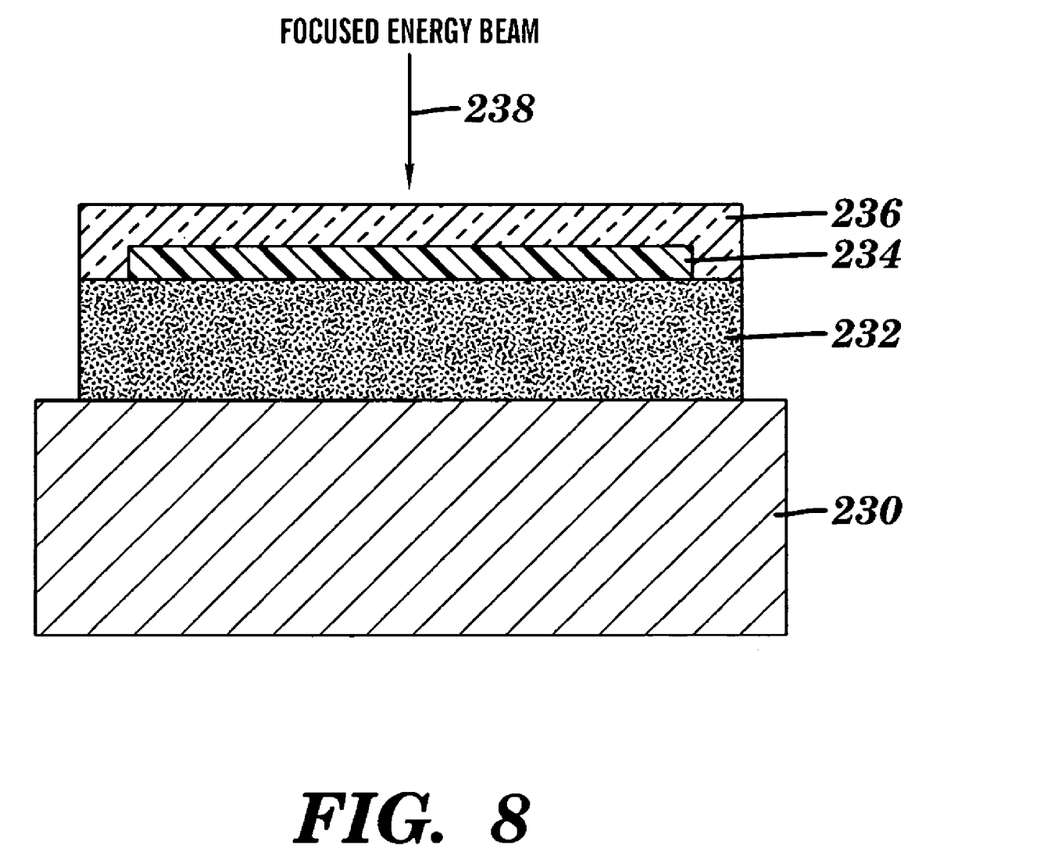
FIG. 8 is a general illustration of the laser treatment of coatings over a substrate.

FIG. 8 is a simplified, cross-sectional depiction of a substrate 230, formed from a nickel-based superalloy. A magnesium oxide layer (MgO) 232 has been direct-written on a portion of the substrate. A sensor material 234, formed of a metal like aluminum, copper, palladium, and the like, has been applied over a portion of MgO layer 232 by the direct-writing process. A glass overcoat 236, which can comprise silica or other glass-forming materials, is also direct-written over sensor material 234 and a portion of MgO layer 232.

It is usually very important that the heat treatment of the overlying coatings does not adversely affect the substrate, e.g., by altering its microstructure to an unacceptable degree. Unfortunately, the required heat-treatment temperature utilized in conventional processes like furnace-heating or plasma torching may far exceed the melting point of the substrate. As an example, the melting temperature of the nickel-based substrate may be about 1300-1400° C. However, the temperature required to consolidate the deposited MgO layer 232 may be as high as about 2800° C., i.e., close to its melting point. Such a temperature can irreparably damage the substrate.

Thus, another embodiment of this invention is directed to a method for curing high-temperature sensor layers formed by a direct-write process, without substantially affecting an underlying substrate or any other layers which have been formed or deposited. In this method, a focused energy source is directed to the sensor material, and to any other layer requiring sintering, consolidation, or any other type of curing treatment. (The sensor material and any associated layers subjected to this technique are usually deposited in powder form).

Non-limiting examples of focused energy sources include plasma torches, laser systems, electron beam systems, and ion beam systems. All of these types of equipment are well-known in the art and commercially available. Laser systems are especially preferred for some embodiments. Examples include $CO_2$ lasers, Nd:YAG lasers, Nd:YVO$_4$ lasers, and XeCl excimer lasers, although many other laser systems are possible as well. As shown in FIG. 8, beam 238 can be directed to one or more layers 232, 234, and 236, without substantially affecting substrate 230.

Those skilled in the art are very familiar with the various properties of lasers and laser delivery systems. Thus, an exhaustive description should not be necessary here. In general, the laser can operate in either the continuous or pulsed mode. The laser allows one to inject a very large amount of energy (which translates into heat) into a particular layer of material, or into a particular portion of that layer, e.g., a specific depth. Interaction of the laser light with the composition of the deposited layer of material causes sintering to begin.

Many aspects of laser treatment are described in Patent Application Publication US 2002/0063117 A1 for Kenneth H. Church et al, published on May 30, 2002 (Ser. No. 09/837,265), and incorporated herein by reference. The operating conditions for the laser are very dependent on the light absorption characteristics of the target material, i.e., the layer(s) being heat-treated. The primary characteristics include absorptivity, temperature, light wavelength, and light temporal pulse width (duration). These factors are important for selecting laser parameters such as power, e.g., peak power ($P_{max}$), and emission wavelength. Those skilled in laser systems understand that some or all of these parameters can be adjusted to obtain the desired heat-treatment depth within one or more layers.

As described in the reference of Church et al, it is sometimes desirable to sinter only a relatively thin, upper portion of a layer. For example, the laser beam could be adjusted to sinter the layer to about 1% to about 10% of its depth. Once this upper portion is sintered at a selected wavelength, it sometimes acts as a reflective mirror which diverts the laser energy. In this manner, sintering of the remainder of the layer can be prevented. Moreover, the parameters can be adjusted so that an upper layer is sintered completely, while one or more of the lower layers remains unaffected by the laser beam. For example, one or more of the lower layers may have been previously heat-treated by some other technique, or may not require a heat treatment. Those skilled in the art will be able to readily determine the most appropriate operating conditions for any of the focused energy techniques described herein.

Another general embodiment of this invention relates to the repair of a measuring device. As described previously, many devices are subjected to extreme operating conditions, in terms of temperature, pressure, physical stress, atmospheric conditions, and the like. These harsh conditions can often cause the devices to fail (as can normal operating conditions, over the course of time). Common reasons for failure include damage to one or more sensor elements, e.g., broken or detached wires or clips.

The direct-write process can be used to readily repair the sensor elements, so that the devices function in the proper manner. For example, a broken wire could be repaired by direct-writing new wire material, to reestablish the connection. Alternatively, the wire could be completely replaced by direct-writing; or a replacement-wire could be direct-written at another location. In similar fashion, many of the pads, layers, insulating materials, bonding sites, etc., mentioned above, could be readily repaired. When necessary, the replaced- or repaired material can be heat-treated afterward, for curing, sintering, and the like. This technique is especially useful for performing rapid repairs which provide durable sensor materials for a variety of measuring instruments, such as thermocouple devices and the various strain-measuring devices described previously.

EXAMPLES

The examples which follow are merely illustrative, and should not be construed to be any sort of limitation on the scope of the claimed invention.

Example 1

In this example, sensor elements for various types of devices were formed on a turbine engine component by a direct-write technique. A Micropen™ device (400 Series), from Ohmcraft, Inc., Honeoye Falls, N.Y.) was used in this example. The pen size varied, depending upon the particular feature being deposited. The deposition material also varied. In each instance, the deposition material was added to the dispenser on the Micropen™ device, which pumps the material to the pen upon command.

The direct-write device was programmed to write according to a selected pattern for a desired feature. The pen speed across the sample of the work-piece varied somewhat, but was usually about 50 mils (1.27 mm) per second. During writing, the pen tip was typically maintained at a distance of less than about 10 mils (254 microns) from the work-piece surface, and substantially perpendicular thereto. In some instances, the writing was carried out in multiple passes to achieve the desired thickness.

Figure 9:
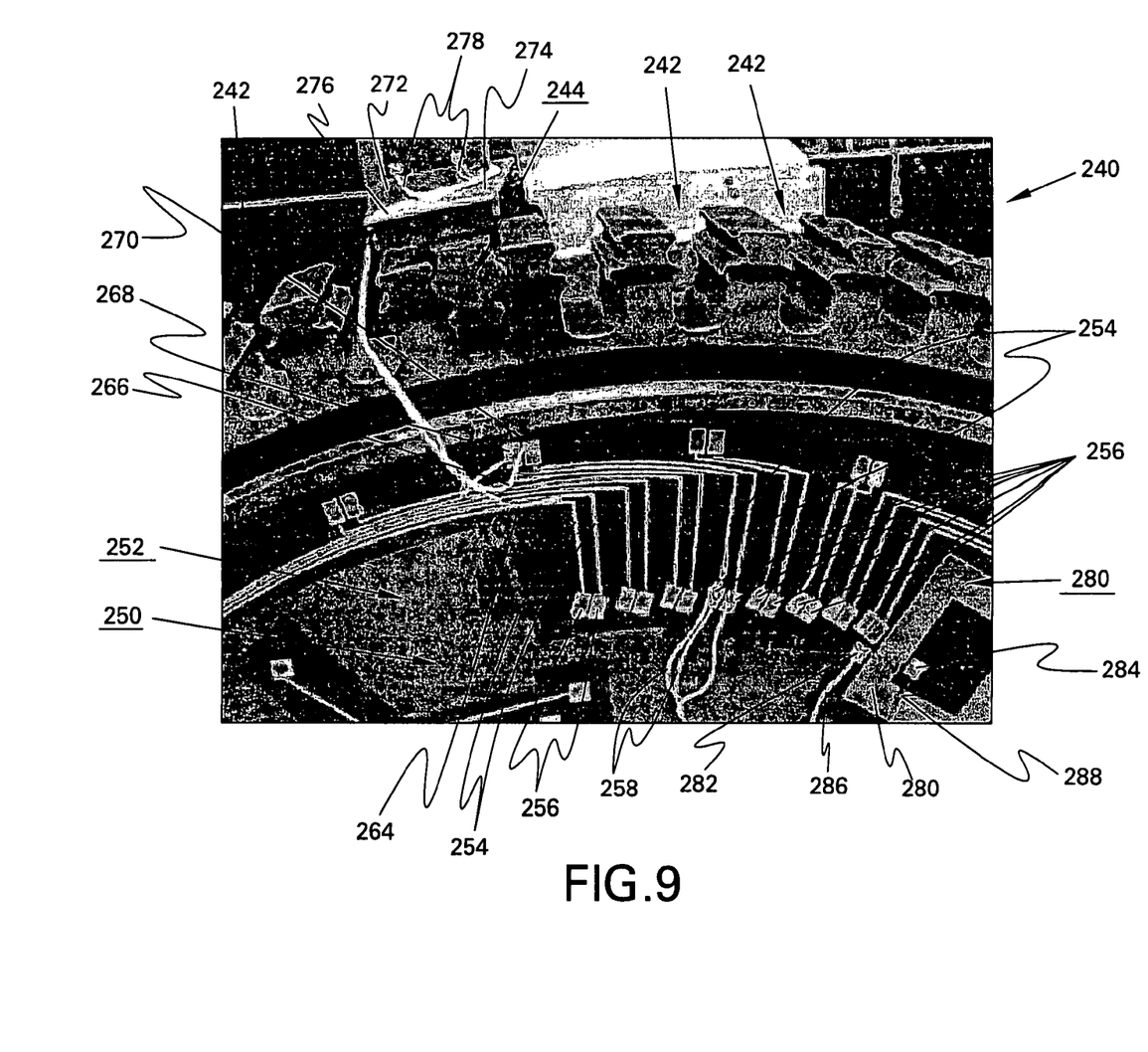
FIG. 9 is an image of a portion of a turbine engine disk, on which various devices have been direct-written.

FIG. 9 is an image of a portion of a turbine disk 240, made from a nickel-based superalloy. Slots 242 for the turbine blades are situated around the outer circumference of the disk. The dovetail section 244 of one typical turbine blade is shown within one of the slots.

Using the Micropen™ direct-write device, a continuous and dense electrical insulation layer 250 was deposited on a portion 252 of the surface of the disk, i.e., its "web portion". Insulation layer 250 was formed from a glass (silica) material. Various sets of conductor lines 254 and contact pads 256 were deposited over insulation layer 250 in the same manner. The conductor lines and contact pads were formed from a palladium alloy. Conventional wires 258 were soldered to contact pads 256, so as to connect conventional blade sensors (not shown) to the conductor lines 254.

As shown in FIG. 9, one set of conductor lines 254 on the web is attached to a wire 264, while another wire 266 is attached to two other contact pads 268, 270, which have also been deposited by direct-write. The two wires are twisted together, and extend to the top surface 272 of a rectangular platform 274 of dovetail section 244. Wires 264 and 266 connect sensor devices on the dovetail platform 274 with the conductors and pads formed on the web, as shown in the figure.

With continued reference to FIG. 9, an insulation layer 276 formed of silica was deposited on the convex surface of the rectangular dovetail platform 274, using the Micropen device. Conductor wires (not completely visible in the figure) were then direct-written over insulation layer 276. The wires were deposited in patterns which resulted in the formation of both a strain gauge and a resistive temperature device (similar to the thermocouple devices described previously), although the exact configurations of these devices are not visible in the figure. Another layer of silica (not completely visible in the photograph) was then direct-written over the two devices. This silica coating served as a protective over-layer for the sensor devices. The turbine disk was then heat-treated in a conventional air furnace at about 300° C.-500° C. for about 30 minutes. The heat treatment improved bonding of the various materials, while also removing volatile components, e.g., binders. Hard wires 278 were then soldered on the strain gauge and the resistive temperature device to make the connections to the disk, completing the electrical circuit.

FIG. 9 also depicts an antenna 280, formed by using the Micropen system. The antenna is in the general shape of a rectangular frame, wherein each side of the frame is formed by a set of multiple, parallel wires (approximately 20 parallel wires per side, and not individually visible at this magnification). Those skilled in the art understand that the large number of wire-turns often increases the sensitivity of the antenna, and decreases static interference. Pads 282 and 284 are deposited (on top of the insulating layer) at the beginning and the end of the "wire-loop" of antenna 280. These pads serve as the connection-site for hard wires 286 and 288 (respectively), which are connected at their opposite ends to other devices, or to a power source, for example. As described previously, the antenna can permit the wireless-monitoring of temperature and strain conditions detected by the devices formed on the turbine blade section.

The sensor devices depicted in FIG. 9 can be connected to conventional devices mentioned above, and not depicted here. In addition to the power supply, the sensor devices can communicate with an oscilloscope, a telemetry receiver unit, and a thermoelectric panel, for example. Those skilled in the field of electrical instruments are familiar with the installation, coordination, and operation of such equipment.

FIG. 9 generally demonstrates some of the advantages mentioned elsewhere in the specification. For example, the multiple lines forming the antenna structure can be deposited with extreme precision and speed, using the direct-write technique. Rapid change in the geometrical patterns for the lines is also possible. Moreover, the composition of the materials which are deposited by the direct-write technique can be rapidly changed, depending on which particular feature or device is being formed. As mentioned previously, the composition-changes for each new feature are carried out with little effort, by simply changing the cartridge or syringe which feeds the pen, in this instance. Thus, the ability to direct-write a large variety of features which constitute many measurement devices is an extremely important attribute associated with this invention.

Example 2

Figure 10:
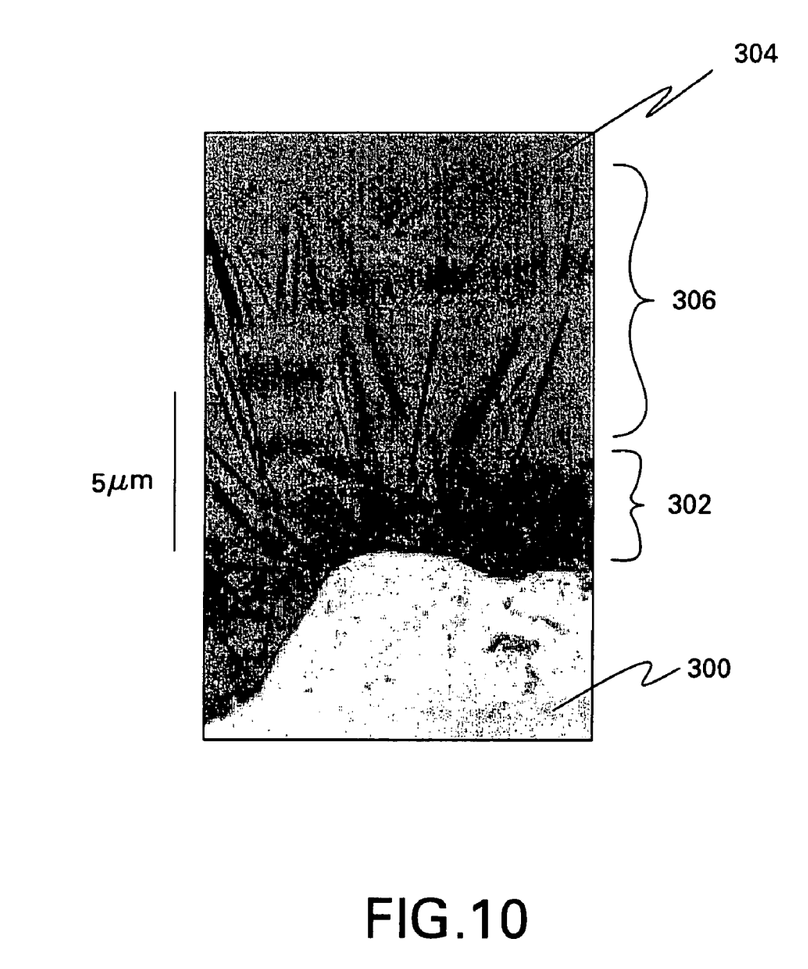
FIG. 10 is a scanning electron microscope image of a cross-section of a processed coating structure on a substrate.

FIG. 10 is a scanning electron microscope (SEM) image, depicting a cross-section of a processed coating structure on a substrate. The substrate 300 was a nickel-based superalloy material. A layer 302 of magnesium oxide (MgO) was deposited over the substrate, using the MicroPen system in a direct-write process. A silica-based glass layer 304 was then deposited over the MgO layer. As deposited, the MgO layer had an approximate thickness of about 350 microns, while the glass layer had an approximate thickness of about 150 microns.

After deposition of the silica layer 304, an Nd-YAG marking laser was used to sinter and densify both MgO layer 302 and silica layer 304 at the same time. The laser system was used in a pulsed mode, at a power level of about 18 watts, with a pulse duration of about 20 ns, and a pulse energy of about 50 mJ.

It is clear from FIG. 10 that both silica (glass) layer 304 and MgO layer 302 have been sintered successfully. There is no evidence of any remaining powder particles of MgO, which would have been an indication of inadequate densification of the material. Moreover, inspection of the sample after the process was completed showed that superalloy substrate 300, which has a much lower melting temperature than the MgO material, was not adversely affected by the laser sintering process. While a laser was used in this example, the other focused energy sources described previously could have been used for sintering and densification.

MgO crystals are shown in the intermediate region 306, formed within the glassy phase. The crystals generally grew perpendicular to the surface, i.e., in the same direction as heat removal. The perpendicular growth is an important attribute when forming uniform and directionally-solidified structures on surfaces, e.g., in turbine component repair.

Persons of ordinary skill in the art will recognize the utility of variations and additions that are possible in both the apparatus and method of use disclosed herein, without departing from the scope of this invention. Accordingly, it is understood that the scope is to be limited only by the appended claims. All of the patents, articles, and texts which are mentioned above are incorporated herein by reference.

What is claimed:

1. A device for measuring at least one property of a material sample, comprising two sensor elements which are formed by a direct write technique on a surface of the material sample, spaced from each other along a dimension of the surface, said sensor elements being connected to each other by an electrical conductor, which is capable of becoming energized;

wherein the device further comprises means for detecting a change in an electrical characteristic of the conductor when it is energized, said change being indicative of a change in the distance between the two sensor elements, and wherein said change in distance is indicative of the at least one property of the material sample, and wherein at least one crack in the sample material is situated on the surface of the sample in a region between the two sensor elements, or in a region proximate to the region between the two sensor elements, and wherein the at least one property is selected from the group consisting of fatigue, creep characteristics, crack initiation, crack growth; electrical properties, sample temperature, stress characteristiacs, and strain characteristics; and wherein the two sensor elements comprise a deposit of a metallic, ceramic, or polymeric material.

2. The device of claim 1, wherein the material comprises an article of metal or a metal alloy.

3. The device of claim 1, wherein the material comprises a ceramic or plastic.

4. The device of claim 1, wherein the two sensor elements are disposed on a test specimen of the material whose property is being measured,
   wherein the two sensor elements have a dimension which changes in response to a change in the physical property of the material, and the dimensional change is measured by a detection means,
   wherein the detection means comprises an electrical device which measures at least one electrical property selected from the group consisting of voltage, current, resistance, and resistivity.

5. The device of claim 1, wherein the means for detecting the change in the electrical characteristic of the conductor comprises wires which connect each of the sensor elements to an electrical measurement means.

6. The deivce of claim 5, wherein the electrical measurement means comprises a voltmeter or an ammeter, and
   wherein the means for detecting the change in the electrical characteristic of the conductor comprises a wireless transmission system which electronically communicates with the electrical measurement means.

7. The device of claim 1, wherein the direct-write technique for forming the sensor element is selected from the group consisting of thermal spray, laser CVD, ink jet, laser particle guidance, matrix assisted pulsed laser evaporation (MAPLE), pen dispensing techniques, and combinations of any of the foregoing.

8. The device of claim 7, wherein the pen-dispensing technique for forming the sensor element is carried out with a robotic pen which itself comprises:
   (i) a computer-controlled machine which includes a stage for mounting the material sample for rotation and orthogonal translation, and an elevator for translation from the stage;
   (ii) a pen tip rotatably mounted to the elevator; and
   (iii) a dispenser joined in flow communication with the pen tip, for ejecting a stream of material onto at least one surface of the material sample.

9. A device comprising a sensing junction attached to a surface of a test specimen, a first wire having one end attached to a first reference junction and the other end attached to an electrical measurement means, a second wire having one end attached to a second reference junction and the other end attached to the electrical measurement means, a third wire having one end attached to the first reference junction and the other end attached to the sensing junction, and a fourth wire having one end attached to the second reference junction and at the other end to the sensing junction, wherein the third and fourth wires are made of disimiliar materials.

10. The device of claim 9, wherein the sensing junction is attached to the surface of the test specimen by a direct-write process.

11. The device of claim 10, wherein at least a portion of one of the first wire, the second wire, the third wire, the fourth wire, the first junction, and the second junction are deposited by a direct-write process.

12. The device of claim 11, wherein the direct-write process for forming the sensing junction, the first wire, the second wire, the third wire, the fourth wire, the first junction or the second junction is selected from the group consisting of thermal spray, laser CVD, ink jet, laser particle guidance, matrix assisted pulsed laser evaporation (MAPLE), pen dispensing techniques, and combinations of any of the foregoing.

13. The device of claim 9, wherein the electrical measurement means comprises a voltmeter or an ammeter.

* * * * *